Figure 1:
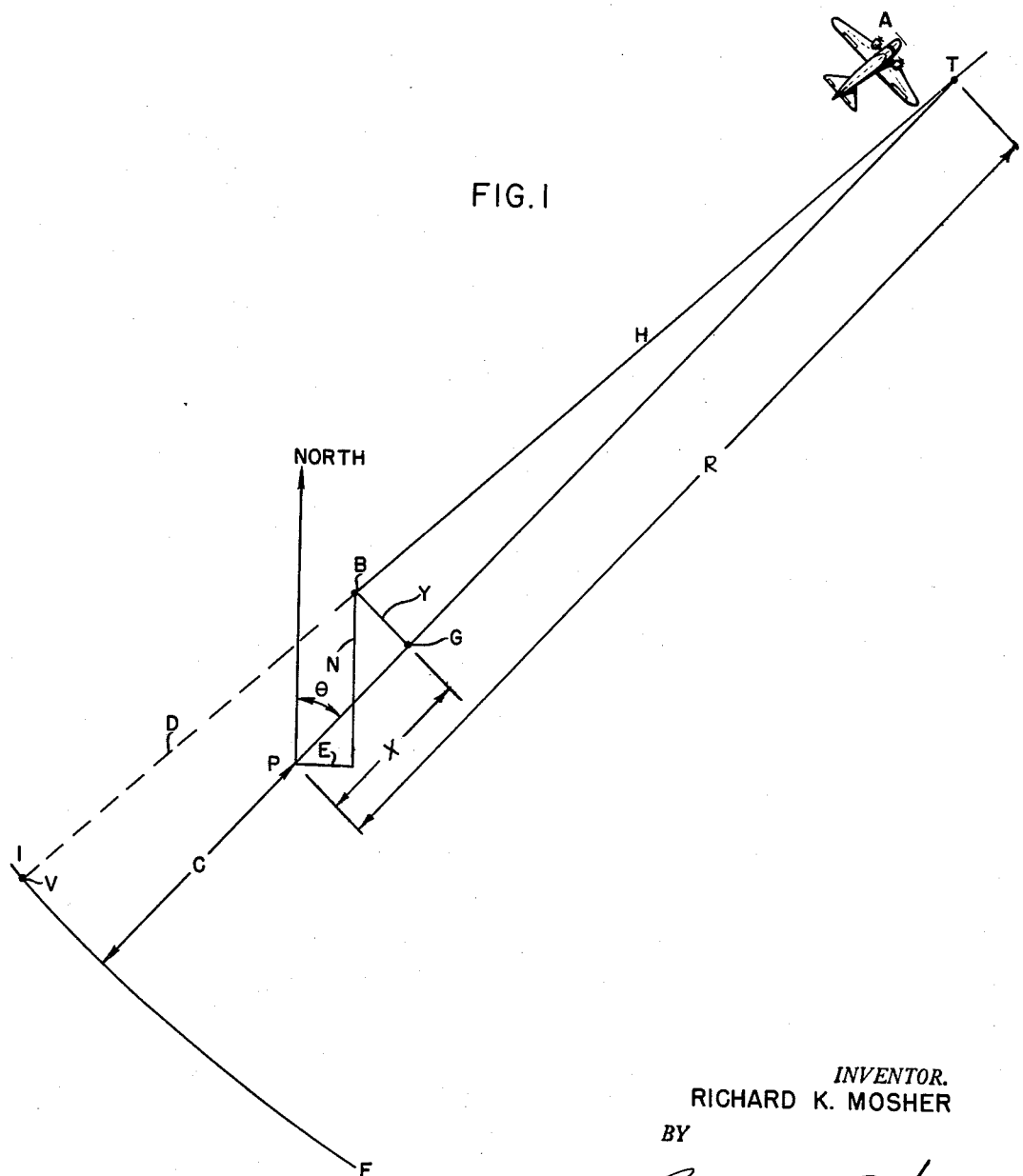

Dec. 6, 1955  R. K. MOSHER  2,726,039
BEACON NAVIGATION SYSTEM
Filed Nov. 27, 1945  2 Sheets-Sheet 1

INVENTOR.
RICHARD K. MOSHER
BY
William D. Hall
ATTORNEY

Dec. 6, 1955  R. K. MOSHER  2,726,039
BEACON NAVIGATION SYSTEM
Filed Nov. 27, 1945  2 Sheets-Sheet 2
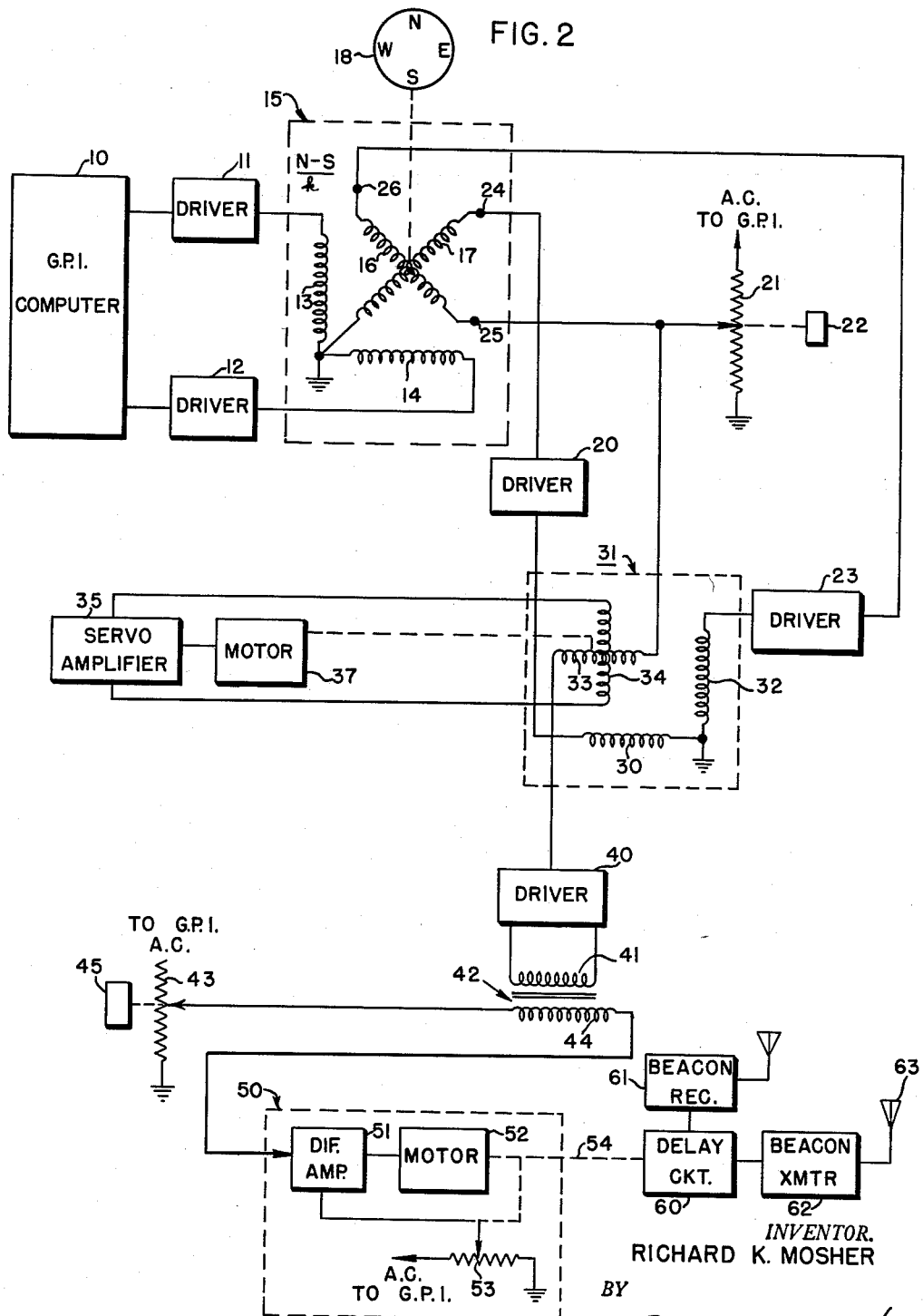
INVENTOR.
RICHARD K. MOSHER
BY
William D. Hall
ATTORNEY

United States Patent Office 2,726,039
Patented Dec. 6, 1955

2,726,039

BEACON NAVIGATION SYSTEM

Richard K. Mosher, Cambridge, Mass., assignor, by mesne assignments, to the United States of America as represented by the Secretary of the Air Force Application November 27, 1945, Serial No. 631,173

6 Claims. (Cl. 235—61)

This invention relates generally to an electrical apparatus and more particularly to a method for increasing the range of a blind beacon navigation system.

The navigation of an aircraft by dead reckoning means to a predetermined point, often becomes difficult due to unpredictable winds, overcast skies, and obstructions of land formations below.

A system of blind navigation, particularly in regard to directing an aircraft over a particular position for bombing, is described in a copending patent application of Britton Chance, Serial No. 617,873, entitled "Electrical Apparatus," and filed September 21, 1945, now Patent No. 2,508,565.

In the system developed by Chance, a pulse is transmitted by the radar system of an interrogating aircraft. A plurality of fixed radio-frequency transmitters (hereinafter referred to as beacons) emit a series of pulses when the interrogation pulse is received. Each series of pulses from a particular beacon is coded to distinguish it from the responses of other beacons. The time interval elapsed between the time the interrogation pulse is transmitted and the succeeding response from each beacon is received, is measured by the radar system in the aircraft and is proportional to the range of the aircraft from each respective beacon. The positions of the fixed beacons are known and by measuring the range from the interrogating aircraft to at least two beacons, the position of the interrogating aircraft may be established.

The aircraft may carry apparatus for automatically tracking in range a plurality of preselected beacons to give a continuous indication of the aircraft position relative to the beacons. The effective range for such a system of blind navigation, using fixed station beacons, is limited to line-of-sight distances, or about 200 miles. Accordingly it is an object of this invention to extend the effective range of such a beacon navigation system by making the beacons airborne.

It is a further object to provide said beacons at temporary locations which may or may not be accessible from land or sea.

In making the beacons airborne, it is essential that movement of the aircraft carrying the beacons be compensated for. Therefore, another object is to provide a virtual beacon whose range appears to be fixed in relation to an interrogating aircraft over a preselected target.

A system for providing airborne beacons which will produce virtual beacons at a fixed range from a preselected target location is disclosed in a copending application of William J. Tull, Serial No. 631,174, entitled "Electrical Apparatus," and filed November 27, 1945, now Patent No. 2,633,567. This system includes a delay computer in an airborne beacon. The airborne beacon receives an interrogation pulse from an interrogating aircraft positioned over a preselected target position. The delay computer automatically computes a time delay and retransmits a reply. The time delay imparted into the reply is such that the reply will appear to the interrogating aircraft positioned over the target position as having originated from a virtual point at a predetermined range from the target position.

It is a further object of this invention to provide a simple delay computer for an airborne beacon.

Other objects, features and advantages of this invention will suggest themselves to those skilled in the art and will become apparent from the following description of the invention taken in connection with the accompanying drawings in which:

Fig. 1 is a geometric drawing of the problems involved in producing a virtual beacon by an airborne beacon; and Fig. 2 is a block diagram of a circuit embodying the principle of this invention.

The problems involved in providing a virtual beacon whose range is fixed from a preselected target by a moving airborne beacon is illustrated by a case shown in Fig. 1. Point T will designate a target to which an interrogating aircraft A is to be directed. A reference point P is established whose range R from target T is known. The angle between the direction north and a line through target T and reference point P will be defined as $\theta$. A virtual beacon will be established along an arc FI the center of which is coincident with target T.

An airborne beacon B, whose instantaneous position is a distance E to the east of, and a distance N to the north of a reference point P, flies about reference point P, always remaining within arc FI. The distance from a target T to beacon B will be designated as H. The extension of H from beacon B in the direction of arc FI will intersect arc FI at virtual beacon V. The distance between beacon B and virtual beacon V will be designated as time delay distance D. Time delay distance D corresponds to the time delay which was defined in connection with the system developed by Tull. Time delay distance D changes in accordance with the instantaneous position of the beacon aircraft B.

The east-west and north-south rectangular coordinate axes of beacon B may be rotated clockwise through the angle $\theta$. By definition, then, coordinate X will designate the position of beacon B relative to reference point P along an axis through target T and reference point P, as represented by the distance P—G. Coordinate Y will designate the length of the normal B—G from beacon B to coordinate X.

According to well known trigonometric relations, the coordinates X and Y are given by the equations:

$$X = E \sin \theta + N \cos \theta \tag{1}$$
$$Y = -E \cos \theta + N \sin \theta \tag{2}$$

To fix the position of beacon B in terms of the rectangular coordinates X and Y the computer must solve Equations 1 and 2.

Depending upon the position of beacon B at any particular instant, the coordinates X and Y may be either positive or negative. For the case shown in Fig. 1, the coordinates X and Y are positive.

From the geometry of the drawings it is apparent that $$R + C = H + D \tag{3}$$

where C is the fixed distance between reference point P and arc FI.

The time delay distance D in each transmitted pulse from beacon B is equal to $$D = R + C - H \tag{4}$$

The delay computer must solve Equation 4 in determining the time delay that beacon B must impart in a reply to an interrogation pulse from interrogating aircraft A. The reply will then appear to interrogating aircraft A at target T as having originated from a virtual beacon, V, along the arc FI.

In right triangle BGT,
$$H = \sqrt{Y^2 + (R-X)^2} \quad (5)$$

Substituting Equation 5 with Equation 4,
$$D = C + R - \sqrt{Y^2 + (R-X)^2} \quad (6)$$

A delay computer which will solve one form of Equation 4, namely Equation 6,
$$D = C + R - \sqrt{Y^2 + (R-X)^2}$$

is shown in Fig. 2.

The terms C, R and $\theta$ are predetermined constants for a particular target T and reference point P, and this factor may be taken into account in the delay computer.

In the delay computer, the terms of Equation 6, representing the respective distances shown in Fig. 1, are converted into equivalent voltages. Equation 6 is then solved by interaction of the voltages.

Referring to Fig. 2, ground position indicator (GPI) computer 10 supplied to driver 11 an alternating voltage the amplitude of which is proportional to a north-south coordinate, N, of airborne beacon B with respect to reference point P. Similarly, GPI computer 10 supplies to driver 12 an alternating voltage, the amplitude of which is proportional to the east-west coordinate, E, of airborne beacon B with respect to reference point P.

The phase of the coordinate voltages will be considered positive for the case being described. However, it is evident that as the beacon aircraft flies about reference point P, the phase of the coordinate voltages may be reversed.

A GPI computer which may be used to supply the above described coordinate voltages has been described in copending patent application by John W. Gray, and Duncan MacRae, Jr., Serial No. 598,162, entitled "Electrical Apparatus," and filed June 7, 1945, now Patent No. 2,594,912. This computer provides automatic means for continuously computing the position of a selected target or navigation point with respect to the aircraft. This data is first computed in rectangular compass coordinates, then converted to polar coordinates by a triangle solver similar to element 31 of this application. Element 10 of this application would include only the rectangular coordinate computer.

The input impedances of driver stages 11 and 12 should be very high so that it will not overload the output of the GPI computer. Also the voltage amplification of the driver stage should be such as to modify the coordinate voltages by a constant $1/k$. This modification of the coordinate voltages is necessary because the volts per mile ratio of the GPI computer output is too great for the great distances encountered in this airborne beacon system. A suitable driver stage having a high input impedance is described in the copending patent application by John W. Gray, Serial No. 580,021, entitled "Electrical Apparatus," filed February 27, 1945.

Driver stage 11, therefore, supplies the primary winding 13 of coordinate resolver 15 with a voltage whose amplitude is proportional to the coordinate $$\frac{N}{k}$$

Driver 12 supplies the primary windings 13 of coordinate resolver 15 with an alternating voltage whose amplitude is proportional to the coordinate $$\frac{E}{k}$$

The fields of the primary windings 13 and 14 of coordinate resolver 15 are rigidly fixed at right angles to each other. The field of the secondary winding 16 of coordinate resolver 15 is rigidly fixed at right angles to the field of the secondary winding 17 of coordinate resolver 15. The secondary windings 16 and 17 may be rotated within the fields produced by primary windings 13 and 14 by rotating azimuth knob 18. Azimuth knob 18 may consist of a dial upon which is inscribed the directions north, south, east and west (N, S, E and W).

One end of the secondary winding 17 is grounded and the output from the opposite end is applied to driver stage 20. Driver stage 20 may be similar to driver stage 11 in which the voltage amplification will be approximately 1.

Potentiometer 21 is supplied by GPI computer 10 with an alternating voltage which is synchronized with the coordinate voltages. One end of the secondary winding 16 is connected to the variable tap of potentiometer 21. The variable tap of potentiometer 21 may be adjusted by range knob 22.

The output from the opposite end of the secondary winding 16 is applied to a driver stage 23. Driver stage 23 may be similar to driver stage 20.

One end of the primary winding 32 of a triangle solver 31 receives the output of the driver stage 23 and the opposite end is grounded. One end of the primary winding 30 of triangle solver 31 receives the output of the driver stage 20 and the opposite end is grounded. The fields of the primary windings 30 and 32 are rigidly fixed at 90° to each other.

The fields of the secondary windings 33 and 34 of triangle solver 31 are rigidly fixed at 90° to each other. The secondary windings may be rotated within the fields produced by the fixed primary windings 30 and 32.

The output of the secondary winding 34 taken from both ends of the winding is applied to servo amplifier 35. Servo systems are well known to those skilled in the art.

The output of servo amplifier 35 is applied to motor 37. The angular displacement of motor 37 determines the angular positions of the secondary windings 33 and 24 with respect to the primary windings 30 and 32.

One end of the secondary winding 33 is connected to the variable tap of potentiometer 21 and the opposite end is connected to the input of driver stage 40. Driver stage 40 may be similar to driver stage 20 in which the voltage amplification is approximately $k$. The output of driver stage 40 is applied to the primary winding 41 of transformer 42.

Potentiometer 43 receives an alternating voltage from GPI computer 10 which is synchronized with the coordinate voltages supplied to the driver stages 11 and 12. The position of the variable tap on potentiometer 43 may be adjusted by delay knob 45.

The output of potentiometer 43, taken from the variable tap, is applied through secondary winding 44 of transformer 42 to servo amplifier 50.

Servo amplifier 50 may include a differential amplifier 51, a motor 52 and a potentiometer 53. Potentiometer 53 is supplied with a suitable alternating voltage from GPI computer 10 which is synchronized with the aforesaid coordinate voltages. Differential amplifier 51 receives the input to the servo amplifier and also a reference voltage from the center tap of potentiometer 53. The differential amplifier produces in its output a voltage whenever there exists a voltage differential between the two inputs.

The output of differential amplifier 51 is applied to motor 52. The angular rotation of motor 52 is applied as an angular displacement through shaft 54 to a mechanically adjustable control element in the delay circuit 60.

Delay circuit 60 receives an interrogation trigger pulse from beacon receiver 61. The angular displacement of shaft 54 acts to control the amount by which the delay circuit 60 delays a trigger pulse input.

Delay circuits are well known to those skilled in the art. Such a circuit may consist of a liquid delay line including a crystal for producing a supersonic wave, a tubular conductor filled with liquid through which the wave travels, and a pickup device for producing a pulse when the supersonic wave reaches the end of the tube. The position of the pickup device is controlled by the angular displacement of shaft 54.

Use of servo amplifier 50 and delay circuit 60 are cited as an example. Any circuit which will produce a delay proportional to the amplitude of an alternating voltage input may be used.

The delayed trigger pulse will cause a reply pulse to be generated by beacon transmitter 62 and radiated from antenna 63.

In explaining the operation of this circuit, reference will now be made to Figs. 1 and 2. In Fig. 2 the azimuth knob 18 is set to correspond to the reference angle $\theta$. The secondary windings of coordinate resolver 15 are thereby oriented in the resultant field produced by the associated primary winding so that the amplitudes of the alternating voltages produced therein are proportional to the coordinates X and Y of beacon B with respect to reference point P. Thus, secondary winding 17 solves Equation 2 and produces at terminal 24 an alternating voltage $E_Y/k$, the amplitude of which is proportional to the coordinate Y shown in Fig. 1. Similarly, secondary winding 16 solves Equation 1 and produces at its output an alternating voltage $E_x/k$, the amplitude of which is proportional to the coordinate X shown in Fig. 1.

To terminal 25 of secondary winding 16 is applied an alternating voltage, $E_R/k$, the amplitude of which is proportional to the fixed range R between the target T and reference point P. The constant $k$ is the same constant $k$ which modified $E_x$. Secondary winding 16 vectorially subtracts the coordinate voltage from the range voltage. Therefore, the amplitude of the alternating voltage appearing at terminal 26 of secondary winding 16 is proportional to the factor $(E_R-E_x)/k$.

The alternating voltage $(E_R-E_x)/k$ is applied through driver stage 23 to primary winding 32 of triangle solver 31. The alternating voltage $E_y/k$ is applied through driver stage 20 to primary winding 30 of triangle solver 31. The fields of the primary windings 30 and 32 are at right angles to each other. The resultant field produced by the primary windings 30 and 32 of triangle solver 31 is proportional to the factor:

$$1/k\sqrt{E_Y^2+(E_R-E_x)^2}$$

When secondary winding 34 of triangle solver 31 is at an angle of 90° with respect to the resultant field of the primary winding, there will be no voltage developed therein. At any other angle there will be developed in the secondary winding 34 an alternating voltage, the amplitude of which is proportional to the angle, and the phase of which is in accordance with the sign of the angle.

Servo amplifier 35 receives the output of the secondary winding 34 and produces in its output a direct voltage, the magnitude of which is proportional to the amplitude of, and the polarity of which is dependent upon the phase of, the alternating voltage input. Direct-current motor 37 receiving the output of the servo-amplifier 35 will rotate in a direction corresponding to the polarity of the direct voltage input. Direct-current motor 37 will therefore rotate secondary windings 33 and 34 of triangle solver 31 until secondary winding 34 is at right angles to the resultant field produced by the voltages applied to the primary windings.

Secondary winding 33, having its field at right angles to the field of secondary winding 34, will have induced in it an alternating voltage, the magnitude of which is proportional to the magnitude of the resulting field. This alternating voltage is proportional to the factor:

$$1/k\sqrt{E_Y^2+(E_R-E_x)^2}$$

and will hereinafter be referred to as a voltage $E_H/k$. Coordinate Y and the distance (R–X) form a right triangle, the hypotenuse of which is distance H. Therefore, the voltage $E_H/k$ is proportional to the distance H shown in Fig. 1.

Applied to one end of secondary winding 33 from potentiometer 21 is an alternating voltage $E_R/k$. The phase of the voltage $E_H/k$ is negative with respect to $E_R/k$ due to the phase reversal of the transformer action. The two are subtracted to give an alternating voltage $(E_R-E_H)/k$, the amplitude of which is proportional to the distance R–H in Fig. 1.

The voltage $(E_R-E_H)/k$ is modified in driver stage 40 and transformer 42 to produce in secondary winding 44 of transformer 42 an alternating voltage $(E_R-E_H)$.

Secondary winding 44 also receives from potentiometer 43 an alternating voltage $E_C$, the amplitude of which is proportional to the distance C shown in Fig. 1. The secondary winding 44 adds the two voltages vectorially to produce an alternating voltage $(E_C+E_R-E_H)$. The amplitude of the alternating voltage $(E_C+E_R-E_H)$ is proportional to the distance D shown in Fig. 1 and will hereinafter be referred to as delay voltage $E_D$.

Differential amplifier 51 of servo amplifier 50 receives the control voltage $E_D$ and produces an output voltage whenever the amplitude of the alternating voltage derived from the potentiometer 53 does not coincide with the voltage $E_D$. Motor 52 therefore drives shaft 54 and potentiometer 53 until the two voltages are equalized. The angular displacement of shaft 54 is therefore proportional to the amplitude of the delay voltage $E_D$.

It has been mentioned that the angular displacement of shaft 54 acts to control the amount by which delay circuit 60 delays an interrogation input pulse. The interrogation input pulse is therefore delayed in time by an interval equivalent to distance D shown in Fig. 1. The delayed interrogation input pulse causes a pulse to be transmitted by beacon transmitter 62. The transmitted pulse will appear to be an interrogating aircraft A at target T to have originated from virtual beacon V along arc FI.

A second airborne beacon transmitter, similar to beacon B, but in a different location, will transmit delayed range data in exactly the same manner as has been described in connection with beacon B. The ranges from the target location T to the virtual beacons are predetermined. Therefore, whenever interrogating aircraft A reaches a position where the ranges to two virtual beacons coincide with the predetermined ranges from target T, the position of the interrogating aircraft A is at target T.

At target position T, the accuracy of the range data transmitted by the two beacons is comparable with the accuracy of the GPI computer, the beacon transmitter, the beacon receiver, and the delay computer. However, for positions of the interrogating aircraft away from target position T there will be range errors, range rate errors, and heading errors. These errors will be a function of both the interrogating aircraft and beacon aircraft positions, the angle between the two beacons, and the speed of the aircraft.

This system of airborne beacons may be adapted to directing a ship or any other vehicle to or towards a particular location. The reference point P may be any convenient location; for instance, it may be fixed on the ground or situated in a ship standing off shore. Reference point P may be a fixed beacon transmitter from which airborne beacon B receives its position data.

While there has been described what is at present considered to be the preferred embodiment of this invention, it will be obvious to those skilled in the art that various changes and modifications may be made therein without departing from the scope of the invention as set forth in the appended claims.

What I claim is:

1. In combination, means for producing first and second coordinate voltages the magnitudes of which are proportional respectively to first and second rectangular coordinates of a moving point with respect to a fixed point, means for algebraically subtracting said first coordinate voltage from a range voltage to produce a third voltage, the magnitude of said range voltage being proportional to the distance and said first rectangular coordinate being in the direction between said reference point and a target point, means for utilizing said second and third voltages to produce mutually perpendicular magnetic fields proportional respectively to said second and third voltages, means utilizing said perpendicular magnetic fields for producing a fourth voltage that is a resultant of the second and third voltages, means for algebraically adding a second range voltage to said first range voltage and subtracting said fourth voltage to produce a control voltage.

2. In combination, means for producing first and second coordinate voltages the magnitudes of which are proportional respectively to first and second rectangular coordinates having a given orientation and defining the position of a moving controller with respect to a reference point, means responsive to said first and second coordinate voltages and to the difference between said orientation and a seocnd orientation corresponding to the direction of a predetermined target point relative to said reference point to produce third and fourth voltages the magnitudes of which are proportional respectively to third and fourth rectangular coordinates, said third coordinate having said second orientation, means for producing a range voltage the magnitude of which is proportional to the distance between said reference point and said target point, means for algebraically subtracting said third coordinate voltage from said range voltage to produce a fifth voltage, means for producing first and second mutually perpendicular inductive fields whose magnitudes are proportional respectively to said fourth and fifth coordinate voltages, means for producing a sixth voltage the magnitude of which is proportional to the resultant field of said first and second fields, means for algebraically subtracting said sixth voltage from said range voltage to produce a seventh voltage, means for producing a second range voltage the magnitude of which is proportional to the normal distance between said reference point and an arc of a predetermined radius from said target point, and means for algebraically adding said seventh voltage to said second range voltage.

3. In combination, means for producing first and second voltages the magnitudes of which are proportional respectively to first and second rectangular coordinates having a given orientation and defining the position of a moving controller with respect to a reference point, means for producing first and second mutually perpendicular magnetic fields whose magnitudes are proportional respectively to said first and second voltages, means utilizing said first and second magnetic fields to produce third and fourth voltages proportional respectively to third and fourth rectangular coordinates oriented with said third rectangular coordinate in the direction of the line between said reference point and a predetermined target point, means for producing a range voltage the magnitude of which is proportional to the distance between said reference point and said predetermined target point, means for algebraically subtracting said third coordinate voltage from said range voltage to produce a fifth voltage, means for producing third and fourth mutually perpendicular inductive fields whose magnitudes are proportional respectively to said fourth and fifth coordinate voltages, means for producing a sixth voltage, the magnitude of which is proportional to the resultant field of said third and fourth inductive fields, means for algebraically subtracting said sixth voltage from said range voltage to produce a seventh voltage, means for producing a second range voltage the magnitude of which is constant and proportional to the shorter normal distance between said reference point and an arc of a predetermined radius from said target point, and means for algebraically adding said seventh voltage to said second range voltage.

4. In combination, means for producing first and second voltages the magnitudes of which are proportional respectively to first and second rectangular coordinates having a given orientation and continuously defining the position of a moving controller with respect to a reference point, means for producing first and second mutually perpendicular magnetic fields whose magnitudes mutually perpendicular magnetic fields whose magnitudes are proportional respectively to said first and second voltages, means utilizing said first and second magnetic fields to produce third and fourth voltages proportional respectively to third and fourth rectangular coordinates oriented with said third rectangular coordinate in the direction of the line between said reference point and a predetermined target point, means for producing a range voltage the magnitude of which is proportional to the distance between said reference point and said predetermined target point, means for algebraically subtracting said third coordinate voltage from said range voltage to produce a fifth voltage, means for producing third and fourth mutually perpendicular inductive fields whose magnitudes are proportional respectively to said fourth and fifth coordinate voltages, means for producing a sixth voltage, the magnitude of which is proportional to the resultant field of said third and fourth inductive fields, means for algebraically subtracting said sixth voltage from said range voltage to produce a seventh voltage, said seventh voltage being proportional to the difference in distance from said target to said controller and to said reference point.

5. In combination, means for producing first and second coordinate voltages the magnitudes of which are proportional respectively to first and second rectangular coordinates defining the position of a moving controller with respect to a reference point, said first coordinate having an orientation corresponding to the direction of a predetermined target point relative to said reference point, means for producing a range voltage the magnitude of which is proportional to the distance between said reference point and said target point, means for algebraically subtracting said first coordinate voltage from said range voltage to produce a third voltage, means for producing first and second mutually perpendicular inductive fields whose magnitudes are proportional respectively to said second and third coordinate voltages, means for producing a fourth voltage the magnitude of which is proportional to the resultant field of said first and second fields, means for algebraically subtracting said fourth voltage from said range voltage to produce a fifth voltage, said fifth voltage being proportional to the difference in distance from said target to said controller and to said reference point.

6. In combination, means for producing first and second coordinate voltages the magnitudes of which are proportional respectively to first and second rectangular coordinates defining the position of a moving controller with respect to a reference point, said first coordinate having an orientation corresponding to the direction of a predetermined target point relative to said reference point, means for producing a range voltage the magnitude of which is proportional to the distance between said reference point and said target point, means for algebraically subtracting said first coordinate voltage from said range voltage to produce a third voltage, means for producing from said second and third coordinate voltages a fourth voltage the magnitude of which is proportional to the root of the sum of the squares of said second and third voltages, means for algebraically subtracting said fourth voltage from said range voltage to produce a fifth voltage, said fifth voltage being proportional to the difference in distance from said target to said controller and to said reference point.

References Cited in the file of this patent

UNITED STATES PATENTS

| | | |
|---|---|---|
| 2,080,186 | Reymond | May 11, 1937 |
| 2,402,359 | Bedford | June 18, 1946 |